(12) United States Patent
Ohnishi et al.

(10) Patent No.: US 10,997,738 B2
(45) Date of Patent: May 4, 2021

(54) THREE-DIMENSIONAL-SHAPE MEASUREMENT DEVICE, THREE-DIMENSIONAL-SHAPE MEASUREMENT METHOD, AND PROGRAM

(71) Applicant: OMRON Corporation, Kyoto (JP)

(72) Inventors: Yasuhiro Ohnishi, Kyotanabe (JP); Takashi Shimizu, Kyoto (JP)

(73) Assignee: OMRON Corporation, Kyoto (JP)

( * ) Notice: Subject to any disclaimer, the term of this patent is extended or adjusted under 35 U.S.C. 154(b) by 35 days.

(21) Appl. No.: 16/483,760

(22) PCT Filed: Nov. 28, 2017

(86) PCT No.: PCT/JP2017/042486
§ 371 (c)(1),
(2) Date: Aug. 6, 2019

(87) PCT Pub. No.: WO2018/163529
PCT Pub. Date: Sep. 13, 2018

(65) Prior Publication Data
US 2019/0392599 A1    Dec. 26, 2019

(30) Foreign Application Priority Data

Mar. 8, 2017 (JP) .............................. JP2017-043722

(51) Int. Cl.
*G06T 7/00* (2017.01)
*G06T 7/521* (2017.01)
(Continued)

(52) U.S. Cl.
CPC ............ *G06T 7/521* (2017.01); *G01B 11/167* (2013.01); *G01B 11/25* (2013.01); *G06T 2207/10152* (2013.01)

(58) Field of Classification Search
CPC . G06T 7/521; G06T 2207/10152; G06T 7/50; G01B 11/167; G01B 11/25
See application file for complete search history.

(56) References Cited

U.S. PATENT DOCUMENTS 4,212,073 A  *  7/1980  Balasubramanian ......... 364/562
7,440,590 B1 * 10/2008  Hassebrook et al. ......... 382/108
(Continued)

FOREIGN PATENT DOCUMENTS

CN          105783784 A       7/2016
CN          106462745 A       2/2017
(Continued)

OTHER PUBLICATIONS

Chinese Office Action (CNOA) dated Jul. 29, 2020 in a counterpart Chinese patent application.
Mohit Gupta et al, "Micro phase shifting", Computer Vision and Pattern Recognition (CVPR), 2012 IEEE Conference, Concise explanation of relevance provided in the specification.
(Continued)

*Primary Examiner* — Ping Y Hsieh
*Assistant Examiner* — Xiao Liu
(74) *Attorney, Agent, or Firm* — Metrolex IP Law Group, PLLC

(57) ABSTRACT

A control device acquires a plurality of observation signals observed using a plurality of projection patterns having different spatial frequencies, as observation signals for a measurement point on a measurement object. The control device repeatedly executes processing for estimating two component signals included in each observation signal, so as to separate the observation signal into two component signals, and calculate a three-dimensional position of the measurement point based on the phases of the separated component signals.

10 Claims, 6 Drawing Sheets

(51) Int. Cl.
*G01B 11/16* (2006.01)
*G01B 11/25* (2006.01)

(56) References Cited

U.S. PATENT DOCUMENTS

| | | | |
|---|---|---|---|
| 8,224,064 B1* | 7/2012 | Hassebrook et al. | 385/154 |
| 10,561,309 B2 | 2/2020 | Das et al. | |
| 2004/0190001 A1* | 9/2004 | Meggit et al. | 356/512 |
| 2012/0092463 A1* | 4/2012 | Liu et al. | 348/50 |
| 2014/0160243 A1* | 6/2014 | Tsuyuki et al. | G01B 11/254 |
| 2015/0049331 A1* | 2/2015 | Ri | G01B 11/25 |
| 2015/0176982 A1* | 6/2015 | Gupta et al. | G01B 11/254 |
| 2015/0271466 A1* | 9/2015 | Yamazaki | H04N 13/0203 |
| 2015/0371393 A1 | 12/2015 | Ramachandra et al. | |

FOREIGN PATENT DOCUMENTS

| | | |
|---|---|---|
| JP | 2005-62063 A | 3/2005 |
| JP | 2006-275529 A | 10/2006 |
| JP | 2008-309551 A | 12/2008 |
| JP | 2009-19941 A | 1/2009 |
| JP | 2011-21970 A | 2/2011 |
| JP | 2015-21862 A | 2/2015 |
| JP | 2016-130663 A | 7/2016 |
| WO | 2016/076796 A1 | 5/2016 |

OTHER PUBLICATIONS

English translation of the International Search Report("ISR") of PCT/JP2017/042486 dated Jan. 9, 2018.
English translation of the Written Opinion("WO") of PCT/JP2017/042486 dated Jan. 9, 2018.
Tongbo Chen et al, "Modulated Phase-Shifting for 3D Scanning", 2008 IEEE Conference on Computer Vision and Pattern Recognition, Jun. 1, 2008, pp. 1-8, IEEE; Relevance is indicated in the EESR dated Dec. 22, 2020.
Shree K. Nayar et al, "Fast Separation of Direct and Global Components of a Scene using High Frequency Illumination", International Conference on Computer Graphics and Interactive Techniques, ACM SIGGRAPH 2006 Papers, Boston, Massachusetts, Jul. 1, 2006, pp. 935-944, ACM, New York, NY, USA; Relevance is indicated in the EESR dated Dec. 22, 2020.
Jinwei Gu et al, "Multiplexed Illumination for Scene Recovery in the Presence of Global Illumination", 2011 International Conference on Computer Vision, Jan. 1, 2011, pp. 691-698; Relevance is indicated in the EESR dated Dec. 22, 2020.
Yi Xu et al, "An Adaptive Correspondence Algorithm for Modeling Scenes with Strong Interreflections", IEEE Transactions on Visualization and Computer Graphics, IEEE Service Center, Los Alamitos, CA, US, May 1, 2009, pp. 465-480, vol. 14, No. 3; Relevance is indicated in the EESR dated Dec. 22, 2020.
Extended European search report (EESR) dated Dec. 22, 2020 in a counterpart European patent application.

* cited by examiner

THREE-DIMENSIONAL-SHAPE MEASUREMENT DEVICE, THREE-DIMENSIONAL-SHAPE MEASUREMENT METHOD, AND PROGRAM

TECHNICAL FIELD

The present invention relates to a technique to measure a three-dimensional shape of a measurement object by projecting a cyclic pattern to the measurement object and using an observed signal generated thereby.

BACKGROUND ART

A phase shift method is known as a technique to measure a three-dimensional shape of an object using an image. The phase shift method is a method of projecting a cyclic pattern to a measurement object using a projector, and analyzing the distortion (phase shift) of the projection pattern that is generated depending on the irregularities on the object surface, so as to restore the three-dimensional shape of the object surface. As an improved method of the phase shift method, a method called micro phase shifting (MPS) is also known (see NPL 1).

In these methods, reflected light from another object that exists around the measurement object may drop the measurement accuracy in some cases. This phenomenon will be described with reference to FIG. 6. FIG. 6 depicts a measurement system using an imaging device 200 and a projector 201. Light 201L having a predetermined pattern is projected from the projector 201 to a measurement object 202, and the projection pattern formed on the surface of the measurement object 202 is captured by the imaging device 200. At this time, the distortion of the projection pattern generated by the surface irregularities of the measurement object 202 appears as a brightness change of the image. Therefore based on this brightness change of the image, the positional relationship among the projector 201, a point on the surface of the measurement object 202, and the imaging device 200, is specified, whereby the height (three-dimensional position) of the surface of the measurement object 202 can be calculated using the triangulation.

However, as shown in FIG. 6, if an object 203 exists near the measurement object 202, the light projected from the projector 201 is reflected on the surface of the object 203, and this reflected light 203L may irradiate to the surface of the measurement object 202. If this occurs, observation signals observed by the imaging device 200 contain not only a reflected light component 201R of the light 201L of the projector 201 (direct component signal), but also a reflected light component 203R of the indirect light 203L from the object 203 (indirect component signal). This indirect component signal 203R becomes noise, and is superimposed on the projection pattern on the surface of the measurement object 202, hence an analysis of the projection pattern (that is, calculation of the phase value of the observation signal) is affected thereby, and a measurement error is generated. In this description, this phenomenon is called "inter-reflection" or "multiple reflection", and an object which causes inter-reflection or multiple reflection (object 203 in the case of FIG. 6) is called a "causative object".

As a method of reducing the influence of the inter-reflection, PTL 1 proposes a method of specifying a causative object which causes the inter-reflection and imaging of a projection pattern projected on the causative object in a dimmed or extinguished light state. However if the light is dimmed or extinguished when the projection pattern is imaged, as in this method, a portion where the three-dimensional shape cannot be measured (that is, a blind spot) may be generated. Further, this method cannot effectively suppress inter-reflection unless the causative object (portion of the projection pattern for which light is dimmed or extinguished) is accurately specified in advance, hence implementing this method in an actual apparatus is difficult.

CITATION LIST

Patent Literature

PTL 1: Japanese Patent Application Publication No. 2008-309551

Non Patent Literature

NPL 1: Gupta, Mohit, and Shree K. Nayar. "Micro phase shifting." Computer Vision and Pattern Recognition (CVPR), 2012 IEEE Conference on. IEEE, 2012.

SUMMARY OF INVENTION

Technical Problem

With the foregoing in view, it is an object of the present invention to provide a technique to reduce the influence of inter-reflection and improve measurement accuracy in a method of measuring a three-dimensional shape based on a phase of a pattern projected to the measurement object.

Solution to Problem

To achieve the above object, the present invention uses a configuration to repeatedly execute processing for estimating two component signals included in an observation signal, so that the observation signal is accurately separated into two component signals.

In concrete terms, a three-dimensional shape measurement device according to the present invention includes: a projection device; an imaging device; and a control device which measures a three-dimensional shape of a measurement object, based on an observation signal observed by the imaging device, in a state of projecting a projection pattern, which has cyclicity in a time direction and a space direction from the projection device to the measurement object. Here it is assumed that the observation signal is a composite signal of a first component signal and a second component signal phases of which are different from each other. The control device acquires a plurality of observation signals observed using a plurality of projection patterns having mutually different spatial frequencies as the observation signals with respect to a measurement point on the measurement object, and sets an initial value of an estimation value of the first component signal for each observation signal. The control device estimates the first component signal and the second component signal included in each observation signal by repeatedly executing operations, the operations including: (1) a first step of determining a corrected estimation value of the first component signal of each observation signal by applying first correction processing, which reduces errors of amplitude and a phase, to the estimation value of the first component signal of each observation signal, (2) a second step of determining an estimation value of the second component signal of each observation signal by subtracting the corrected estimation value of the first component signal from each observation signal, (3) a third step of determining a corrected estimation value of the second component signal of each observation signal by applying second correction processing, which reduces errors of amplitude and a phase, to the estimation value of the second component signal of each observation signal, and (4) a fourth step of determining the estimation value of the first component signal of each observation signal by subtracting the corrected estimation value of the second component signal from each observation signal. Then the control device calculates a three-dimensional position of the measurement point based on a phase of the estimated first component signal or second component signal.

According to this configuration, by repeatedly executing the operations including the first to fourth steps, the estimation value of each component signal is sequentially updated so as to reduce errors (differences from the true values) of the amplitude and the phase of each component signal. Therefore the observation signal can be accurately separated into two component signals. Then by using the phases of the separated component signals for calculating the three-dimensional position of the measurement point, the three-dimensional shape can be accurately measured with reducing the influence of inter-reflection.

The method of the present invention can be used even when the ratio of the first component signal and the second component signal included in the observation signal is completely unknown, that is, even when no special prior knowledge and preconditions are available. For example, in actual situations, measurement conditions vary, such as the degree of influence of inter-reflection, the shape of the causative object (e.g. shape of the reflection surface, orientation), the reflection characteristics (e.g. reflectance) and the positional relationship between the causative object and the measurement object, but the method of the present invention could be applied universally under any conditions. This means that the present invention can be easily implemented in actual apparatuses.

In the case of using the present invention to reduce the influence of inter-reflection, it is preferable that one of the first component signal and the second component signal is a direct component signal, which corresponds to light which is projected from the projection device, is reflected at the measurement point and enters the imaging device, and the other signal is an indirect component signal, which corresponds to light which is projected from the projection device, is reflected by another reflection surface, is reflected at the measurement point and enters the imaging device.

It is preferable that the first correction processing includes "acquiring a plurality of amplitude values and a plurality of phase values for each spatial frequency of the plurality of projection patterns by calculating the amplitude and the phase from the estimation value of the first component signal of each observation signal, determining a corrected amplitude value such that the corrected amplitude value is greater than the minimum value and smaller than the maximum value of the plurality of amplitude values, normalizing the plurality of phase values and determining a corrected phase value such that the corrected phase value is greater than the minimum value and smaller than the maximum value of the plurality of normalized phase values, and reproducing a brightness signal for each spatial frequency of the plurality of projection patterns based on the corrected amplitude value and the corrected phase value". In this case, the reproduced brightness signal for each spatial frequency is the corrected estimation value of the first component signal of each observation signal.

It is preferable that the second correction processing includes "acquiring a plurality of amplitude values and a plurality of phase values for each spatial frequency of the plurality of patterns by calculating the amplitude and the phase from the estimation value of the second component signal of each observation signal, determining a corrected amplitude value such that the corrected amplitude value is greater than the minimum value and smaller than the maximum value of the plurality of amplitude values, normalizing the plurality of phase values and determining a corrected phase value such that the corrected phase value is greater than the minimum value and smaller than the maximum value of the plurality of normalized phase values, and reproducing a brightness signal for each spatial frequency of the plurality of projection patterns based on the corrected amplitude value and the corrected phase value". In this case, the reproduced brightness signal for each spatial frequency is the corrected estimation value of the second component signal of each observation signal.

The amplitude value calculated from the estimation value of each component signal includes an error, and the magnitude of the error (absolute value of the difference from the true value) and the positive/negative of the value (whether the value is greater or smaller than the true value) differ depending on the spatial frequency of the projection pattern. In other words, "a plurality of amplitude values", which are estimated for each spatial frequency of the plurality of projection patterns, are more likely to be distributed on the positive side and the negative side of the true value. In other words, the true value of the amplitude value is more likely to be between the minimum value and the maximum value of the plurality of amplitude values. Therefore the corrected amplitude value determined like this is expected to be closer to the true value compared with the amplitude value having the largest error among the plurality of amplitude values.

In the same manner, the phase value calculated from the estimation value of each component signal includes an error, and the magnitude of the error (absolute value of the difference from the true value) and the positive/negative of the value (whether value is greater or smaller than the true value) differ depending on the spatial frequency of the projection pattern. In other words, "a plurality of phase values", which are estimated for each spatial frequency of the plurality of projection patterns, are more likely to be distributed on the positive side and the negative side of the true value. In other words, the true value of each phase value is more likely to exist between the minimum value and the maximum value of the plurality of phase values. Therefore the corrected phase value determined like this is expected to be closer to the true value compared with the phase value having the largest error among the plurality of phase values.

As a consequence, errors of the amplitude value and the phase value of each component signal can be reduced by the first correction processing and the second correction processing described above.

It is preferable that the corrected amplitude value is a mean value or a median value of the plurality of amplitude values. It is also preferable that the corrected phase value is a mean value or a median value of the plurality of normalized phase values. Thereby errors of the amplitude value and the phase value can be reduced using simple arithmetic processing.

It is preferable that the processing for normalizing the plurality of phase values is processing for converting the plurality of phase values into phase values with respect to a common spacial frequency. The phase value that is calculated from each component signal is a phase value with respect to a spatial frequency of a projection pattern which was used for observing the component signal. Therefore by performing normalization to convert the plurality of phase values into phase values with respect to a common spatial frequency, as mentioned above, the plurality of phase values can be compared with each other.

If the damping ratios of the plurality of amplitude values are different depending on the spatial frequency, normalization to cancel the difference of each damping ratio of the plurality of amplitude values may be performed before determining the corrected amplitude value. If the damping ratios are the same or if the difference of the damping ratios can be ignored, the normalization of the amplitude values may be omitted.

It is preferable that the control device calculates the three-dimensional position of the measurement point by the phase shift method or micro phase shifting (MPS) based on the phase of the estimated first component signal or second component signal.

The present invention may be regarded as a three-dimensional shape measurement device or image processing device that includes at least a part of the above mentioned configurations or functions. The present invention may also be regarded as an inspection apparatus, a three-dimensional scanner or an object recognition device that includes this three-dimensional shape measurement device. Further, the present invention may be regarded as a three-dimensional shape measurement method, an image processing method, an inspection method or an object recognition method that includes at least a part of the above mentioned processing, or a program that causes a computer to execute these methods, or a non-transitory computer readable recording medium that records this program. Each of the above mentioned configurations and processing may be combined with each other to constitute the present invention, as long as no technical inconsistency is generated.

Advantageous Effects of Invention

According to the present invention, the influence of inter-reflection can be reduced and the measurement accuracy can be improved in a method of measuring a three-dimensional shape based on a phase of a pattern projected to the measurement object.

DESCRIPTION OF EMBODIMENTS

The present invention relates to a three-dimensional shape measurement technique to measure a three-dimensional shape of a measurement object based on the change of the phase of a pattern projected to the measurement object, and more particularly to a method of reducing the influence of inter-reflection caused by a reflection surface that exists around the measurement object, and improving the measurement accuracy. The present invention can be suitably applied to a three-dimensional shape measurement using a phase shift method or micro phase shifting (MPS) which is an improved phase shift method, and to a three-dimensional shape measurement using a time of flight (TOF) type phase shift method. The three-dimensional shape measurement according to the present invention can be applied to various apparatuses, such as a three-dimensional scanner which measures the surface shape of an object, an inspection apparatus which inspects an object based on a measured three-dimensional shape, and an apparatus which performs object recognition or individual identification based on a measured three-dimensional shape. For example, in the case of a visual inspection apparatus for a surface mount substrate, inter-reflection caused by the metal components on the substrate may drop inspection accuracy, therefore the three-dimensional shape measurement according to the present invention can be especially useful if applied.

An example of a preferred embodiment of the present invention will be described with reference to the drawings. However the configurations and operations of the apparatuses described in the following embodiment are examples, and are not intended to limit the scope of the invention only to these configurations and operations.

(Configuration of Three-Dimensional Shape Measurement Device)

Figure 1:
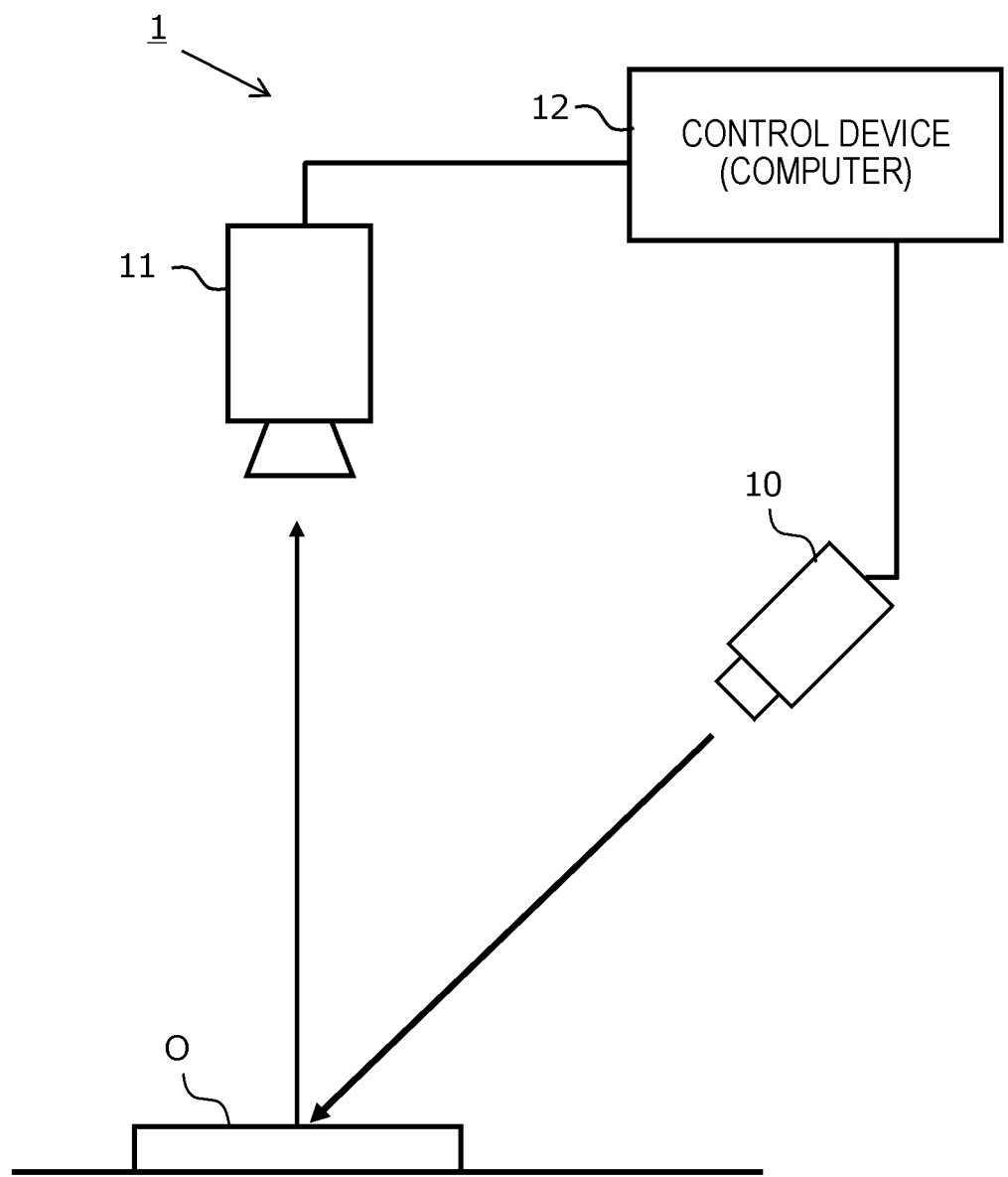
FIG. 1 is a schematic diagram depicting a hardware configuration of a three-dimensional shape measurement device.

A general configuration of a three-dimensional shape measurement device according to this embodiment will be described with reference to FIG. 1. FIG. 1 is a schematic diagram depicting a hardware configuration of the three-dimensional shape measurement device. The three-dimensional shape measurement device 1 is an apparatus to measure a three-dimensional shape of a measurement object O, and is constituted of a projection device (projector) 10, an imaging device (camera) 11, and a control device (computer) 12.

The projection device 10 is a projection unit that projects a pattern which has a cyclicity in the time direction and the space direction to the measurement object O. A number of projection devices 10 may be one, but a plurality of projection devices 10 may be disposed so that the pattern can be projected to the measurement object O in a plurality of directions. For the projection device 10, a digital light processing (DLP) projector using a digital mirror device can be preferably used. This is because a DLP projector can easily change the projection patterns.

The imaging device 11 is a unit that captures an image of a measurement object O to which a pattern is projected, and outputs a digital image. The imaging device 11 is constituted of an optical system and an image sensor, for example. When the three-dimensional shape measurement is performed, the imaging device 11 captures a plurality of images while changing the phase of the pattern projected from the projection device 10. In this description, a brightness of the measurement object O that is observed by the imaging device 11 is called an "observation signal", and an image captured by the imaging device 11 is called an "observation image". In other words, a value of each pixel of an observation image indicates an observation signal (brightness value) at a corresponding measurement point on the measurement object. In this embodiment, a plurality of observation images are acquired while changing the spatial frequency of the projection pattern.

The control device 12 is a unit that has such functions as controlling the projection device 10 and the imaging device 11, processing an image captured by the imaging device 11, and measuring a three-dimensional shape. The control device 12 may be a computer which includes a CPU (processor), a memory, a non-volatile storage device (e.g. hard disk, flash memory), an input device (e.g. keyboard, mouse, touch panel), and a display device (e.g. liquid crystal display). Each function of the control device 12, which will be described later, can be implemented by loading a program stored in the non-volatile storage device and the CPU executing this program. However all or a part of the functions of the control device 12 may be performed by an ASIC, an FPGA or dedicated hardware. Further, the functions of the control device 12 may be implemented by the collaboration of a plurality of computers, utilizing techniques of distributed computing and cloud computing.

Figure 2:
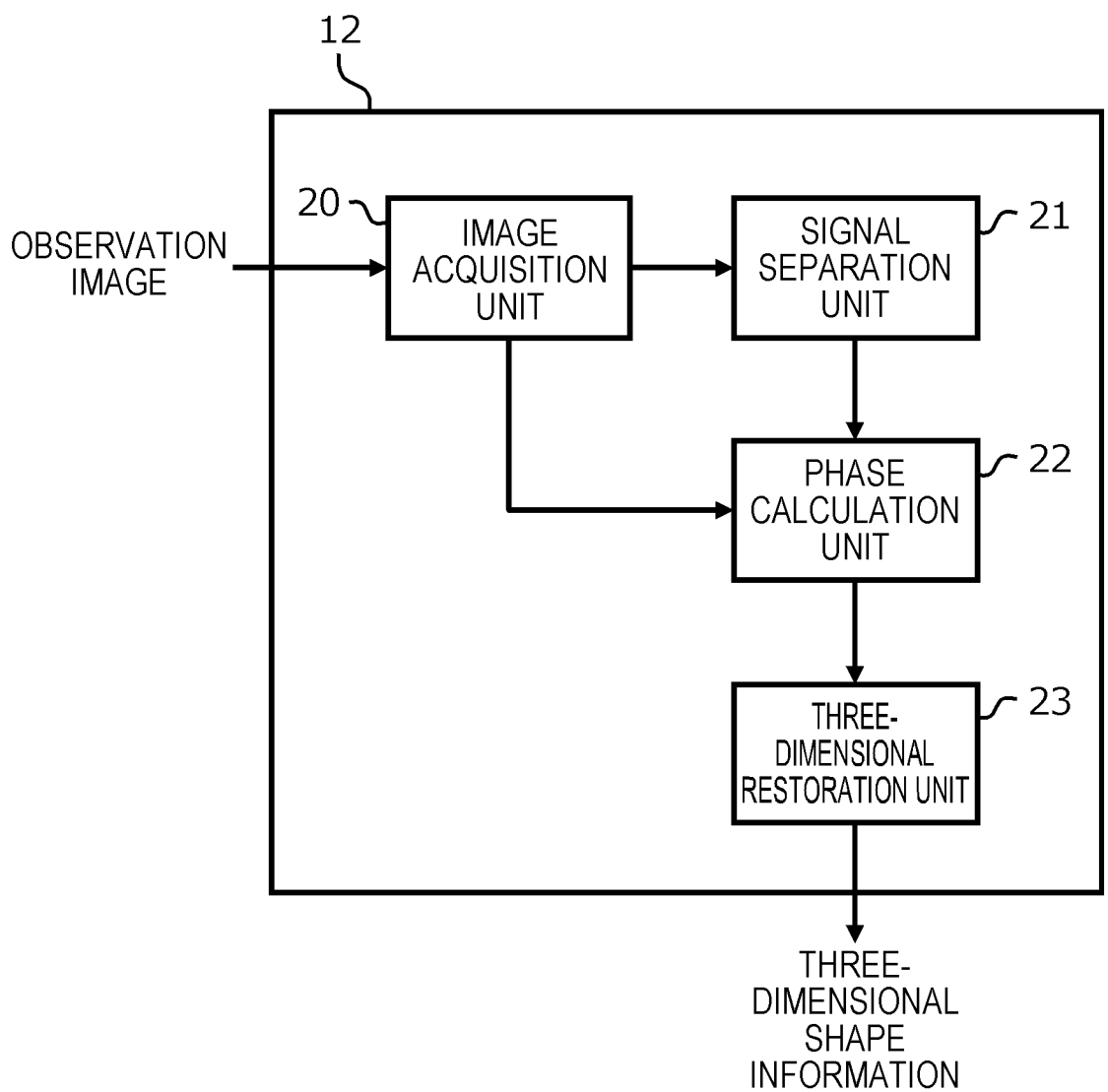
FIG. 2 is a block diagram depicting functions related to the three-dimensional shape measurement.

FIG. 2 is a block diagram depicting the functions of the control device 12 related to the three-dimensional shape measurement. For the functions related to the three-dimensional shape measurement, the control device 12 includes an image acquisition unit 20, a signal separation unit 21, a phase calculation unit 22, and a three-dimensional restoration unit 23.

The image acquisition unit 20 has a function to acquire a plurality of observation images used for the three-dimensional shape measurement from the imaging device 11. The signal separation unit 21 has a function to separate the observation signal into two component signals for each pixel of the observation image. The phase calculation unit 22 has a function to calculate the phase values of the separated component signals. The three-dimensional restoration unit 23 has a function to calculate a three-dimensional position of each pixel (that is, each measurement point on the surface of the measurement object O) on the observation image based on the phase values calculated by the phase calculation unit 22. These functions will be described later.

(Model of Inter-Reflection and Observation Signal)

Figure 3A:
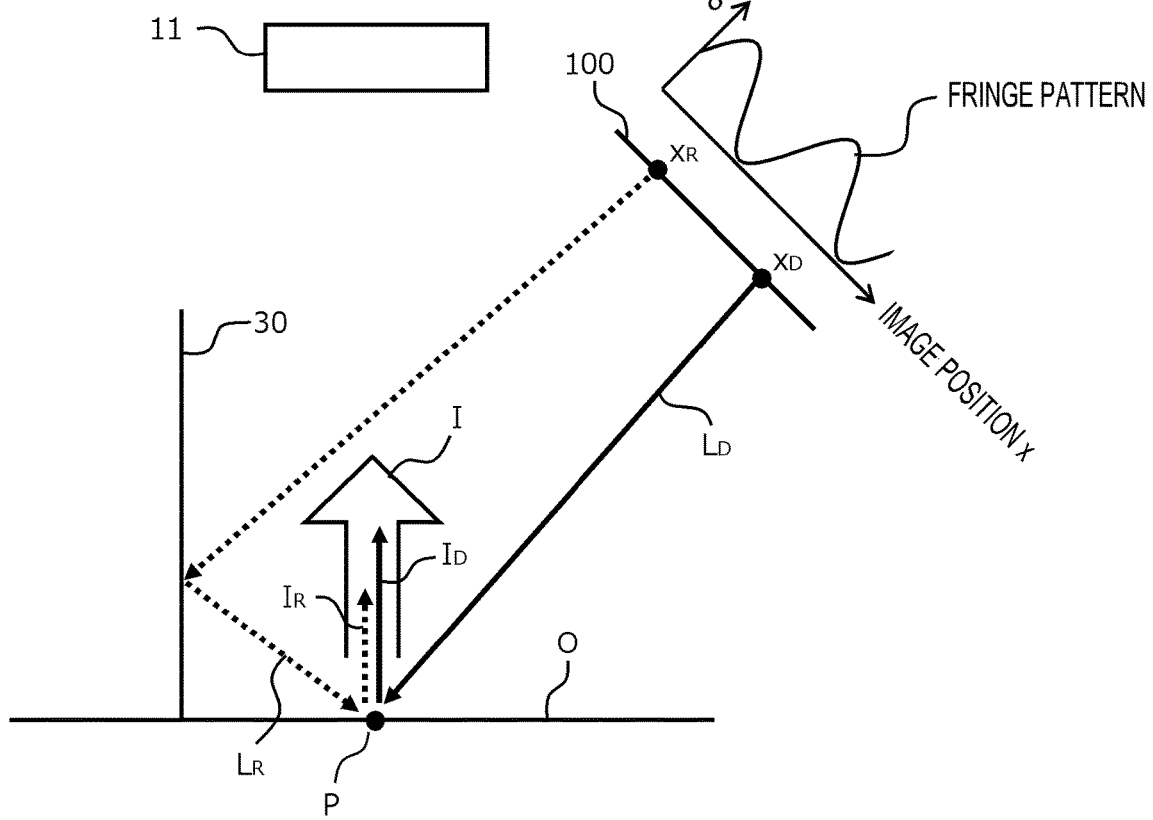
FIG. 3A and FIG. 3B are schematic diagrams depicting models of inter-reflection and an observation signal.
Figure 3B:
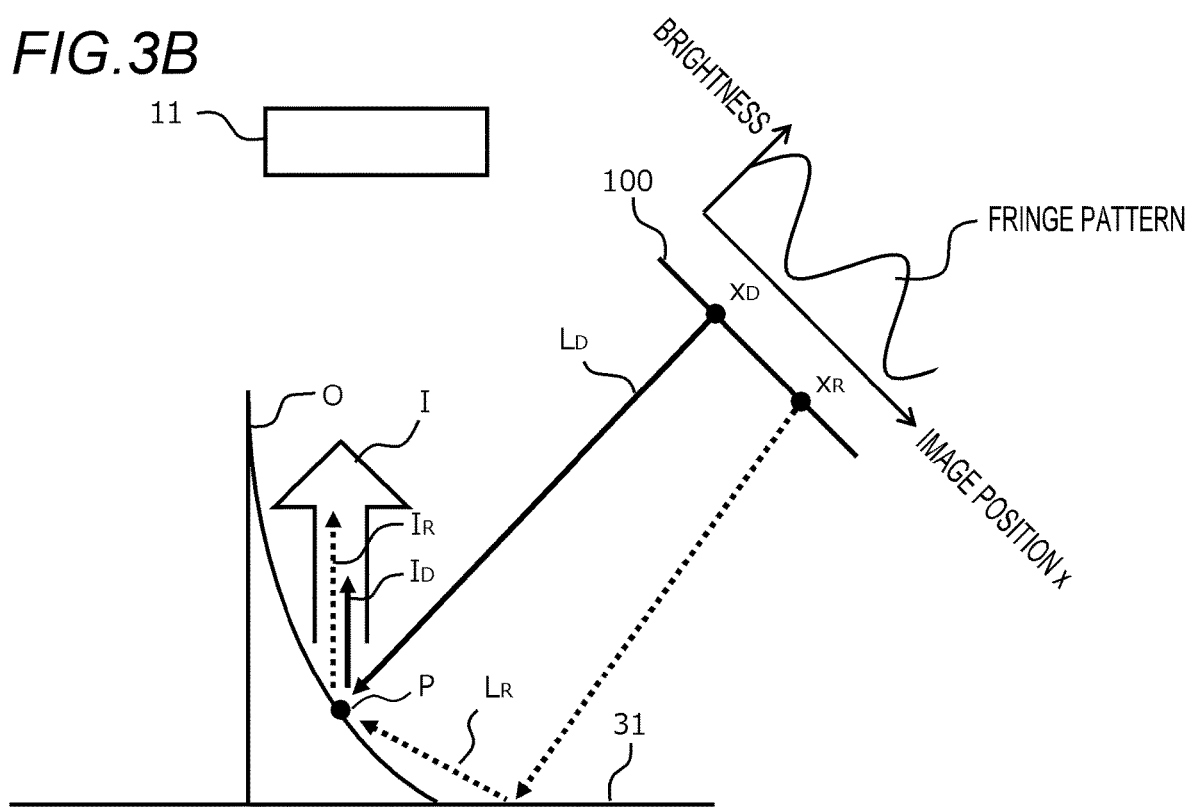

FIG. 3A and FIG. 3B illustrate the models of inter-reflection and an observation signal.

FIG. 3A is an example when a reflection surface 30 having a high specularity (e.g. surface of a metal object) exists near a measurement object O having a diffusion reflection surface. FIG. 3B is an example when a diffusion reflection surface 31 exists near a measurement object O reflection surface of which has high specularity.

In the case where a projection image 100 having a sinusoidal fringe pattern is projected from the projection device 10, it is assumed that light $L_D$ corresponding to the position $X_D$ on the projection image 100 (the light $L_D$ is called direct light), and the reflection light $L_R$ of the light corresponding to the position $x_R$ on the projection image 100, reflected by the reflection surface 30 or 31 (this light $L_R$ is called indirect light) reach the measurement point P on the measurement object O.

In this case, the observation signal I observed by the imaging device 11 becomes a composite signal of the light $I_D$ (direct component signal), which is generated when the direct light $L_D$ was reflected at the measurement point P and entered the imaging device 11, and the light $I_R$ (indirect component signal), which is generated when the indirect light $L_R$ was reflected at the measurement point P, and entered the imaging device 11. The desired signal which is necessary to the three-dimensional shape measurement is the direct component signal $I_D$. In the state illustrated in FIG. 3A, the indirect component signal $I_R$ attenuates during the reflection on the reflection surface 30, hence the intensity of the direct component signal $I_D$ becomes higher than the intensity of the indirect component signal $I_R$. In the state illustrated in FIG. 3B, on the other hand, the light $L_D$ is mostly reflected on the specular reflection surface in the positive reflection direction, hence the intensity of the indirect component signal $I_R$ may become higher than the intensity of the direct component signal $I_D$.

It is assumed that the spatial frequency of the projection pattern is w, the frequency in the time direction (time frequency) is v, the amplitude of the direct component signal $I_D$ is $A_D$, and the amplitude of the indirect component signal $I_R$ is $A_R$. In this case, an observation signal I (ω, t) at time t can be expressed as an addition of a direct component signal $I_D$ (ω, t) and an indirect component signal $I_R$ (ω, t) as follows.

$$I(\omega,t)=I_D(\omega,t)+I_R(\omega,t)$$

$$I_D(\omega,t)=A_D\cos(\omega X_D vt)+C_D$$

$$I_R(\omega,t)=A_R\cos(\omega x_R+vt)+C_R \quad \text{[Math. 1]}$$

If the phase φ' (ω, Δx) and the amplitude A' (ω,Δx) are calculated regarding the observation signal as a single component signal, then the following is estimated (where $\Delta x = x_D - x_R$).

$$A'^2(\omega, \Delta x) = A_D^2 + A_R^2 + 2A_D A_R \cos 2\omega \Delta x \quad \text{[Math. 2]}$$

$$\phi'(\omega, \Delta x) = \omega x_D + \tan^{-1}\frac{A_R \sin 2\omega \Delta x}{A_D + A_R \cos 2\omega \Delta x}$$

The desired signal is the direct component signal $I_D$, hence the true value of the amplitude is $A_D$ and the true value of the phase is $\omega x_D$. However an error is generated in both the amplitude and the phase because of the influence of inter-reflection (indirect component signal $I_R$). As the above expression indicates, this error depends on the spatial frequency ω of the projection pattern and the difference Δx.

(Signal Separation Method)

A method of separating the direct component signal (desired signal) from the observation signal will be described next.

In this embodiment, it is assumed that the observation signal is a composite signal of two types of component signals phases of which are mutually different. Out of the two types of component signals, a signal amplitude of which is larger and the signal intensity is higher is defined as a primary component signal (subscript "P" is attached), and the other signal is defined as a secondary component signal (subscript "s" is attached). In most cases, the primary component signal corresponds to the direct component signal, and the secondary component signal corresponds to the indirect component signal, therefore in this embodiment, the primary component signal, separated from the observation signal, is used for the three-dimensional shape measurement. There may be a case where the signal intensity of the direct component signal becomes lower, as illustrated in FIG. 3B, but in this case, the secondary component signal may be used for the three-dimensional shape measurement.

The signal separation method of this embodiment utilizes a property in which errors of the amplitude and phase generated by the influence of inter-reflection depend on the spatial frequency of the projection pattern. Therefore for input, a plurality of observation signals, which were observed using a plurality of projection patterns having mutually different spatial frequencies, are used. When the spatial frequency of the projection pattern is $\omega_k$ (k=1, ..., K) and the time frequency is $v_k$, then the observation signal can be expressed as follows.

$$I_o(\omega_k,t)=A_D(\omega_k)\cos(\omega_k x_D+v_k t)+A_R(\omega_k)\cos(\omega_k x_R+v_k t)+C(\omega_k)$$ [Math. 3]

For preprocessing, an offset component (DC component) $C(\omega_k)$ is removed from the observation signal $I_o(\omega_k, t)$. For the repeated operation in the subsequent steps, the observation signal $I(\omega_k, t)$ determined by removing the offset component as follows is used.

$$I(\omega_k,t) \triangleq I_o(\omega_k,t)-C(\omega_k)$$ [Math. 4]

The value of the offset component $C(\omega_k)$ in the spatial frequency $\omega_k$ is calculated as follows, using the sum of the observation signals in one cycle in the time direction, for example.

$$C(\omega_k) = \frac{1}{T}\sum_{t=0}^{T-1} I_O(\omega_k, t)$$ [Math. 5]

Instead of estimating the value of the offset component for each spatial frequency, a value of the offset component estimated using another observation signal having a similar spatial frequency may be used as a substitute of the value of the offset component for each spatial frequency. If this substitute of the offset is not used, at least three observation images having mutually different phases are necessary for each spatial frequency $\omega_k$, to implement desired processing. If this substitute of the offset is used, on the other hand, desired processing can be implemented if at least two observation images having mutually different phases are acquired for each spatial frequency. Therefore by using this substitute of the offset, a necessary number of times of projections and number of times of image capturing can be reduced, whereby the three-dimensional shape measurement can be performed faster.

Figure 4:
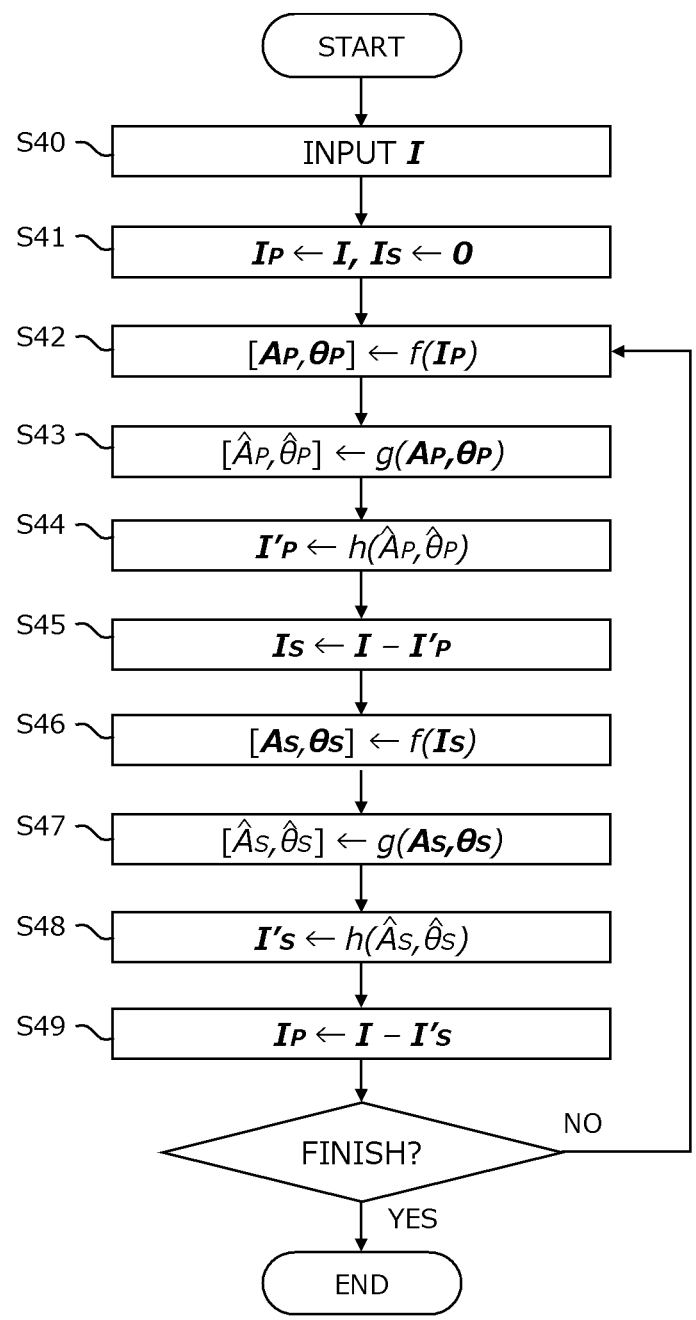
FIG. 4 is a flow chart depicting signal separation processing.

FIG. 4 is a flow chart depicting the signal separation processing that is executed by the signal separation unit 21. The processing in FIG. 4 is executed for each pixel of the observation image. Hereafter a processing target pixel is called a "pixel of interest".

In step S40, the signal separation unit 21 acquires a set I of the observation signals $I(\omega_k, t)$ of the pixels of interest (in FIG. 4, a set is denoted in bold). An observation signal set I is constituted of a plurality of observation signals I ($\omega_1$, t), ..., I ($\omega_K$, t) corresponding to a plurality of spatial frequencies $\omega_1$, ..., $\omega_K$. The observation signal of each spatial frequency includes a plurality of observation signals I ($\omega_k$, 0), I ($\omega_k$, 1), ..., I ($\omega_k$, $T_k$-1), which are observed at a plurality of times (T=0, 1, ..., $T_k$-1), having mutually different phases. The observation signal I ($\omega_k$, t) is a signal after the offset component is removed, and $T_k$ indicates a time cycle of the projection pattern.

The observation signal I ($\omega_k$, t) is a composite signal of a primary component signal $I_P$ ($\omega_k$, t) and a secondary component signal $I_S$ (($\omega_k$, t), but the ratio of these component signals (intensity ratio) is unknown. Therefore in this embodiment, the signal separation unit 21 sequentially updates the estimated value (approximate value) of each component signal by repeatedly applying the single component estimation method having low separation performance to each component signal, so as to estimate a true value of each component signal.

First in step S41, the signal separation unit 21 sets the initial values of the primary component signal $I_P$ ($\omega_k$, t) and the secondary component signal $I_S$ ($\omega_k$, t) for the observation signal I ($\omega_k$, t) of each spatial frequency $\omega_k$. In this embodiment, the observation signal I ($\omega_k$, t) is set as the initial value of the primary component signal $I_P$ ($\omega_k$, t), and the initial value of the secondary component signal $I_S$ ($\omega_k$, t) is set to 0. In FIG. 4, the bold symbol $I_P$ indicates the primary component signal set, and the bold symbol $I_S$ indicates the secondary component signal set.

In step S42, the signal separation unit 21 calculates the amplitude value $A_P$ ($\omega_k$) and the phase value $\varphi_P$ ($\omega_k$) from the primary component signal $I_P$ ($\omega_k$, t) for each spatial frequency $\omega_k$. Generally when signals having the same spatial frequency $\omega_k$ are observed with equal time intervals for one cycle, the signal at each time t is given by the following expression using the time frequency $v_k$.

$$I_P(\omega_k,t)=A(\omega_k)\cos(\omega_k x+v_k t), t=0,1,\ldots T_k-1$$ [Math. 6]

These signals $I_P$ ($\omega_k$, 0), $I_P$ ($\omega_k$, 1), ..., $I_P$ ($\omega_k$, $T_k$-1) are frequency-converted, then the component J ($\omega_k$, $v_k$) of time frequency $v_k$, which is a first harmonic, becomes as follows, (where j is an imaginary unit).

$$J(\omega_k,v_k)=A(\omega_k)e^{j\omega_k x}$$ [Math. 7]

Therefore the amplitude value $A_P$ ($\omega_k$) and the phase value $\varphi_P$ ($\omega_k$), with respect to the spatial frequency $\omega_k$, can be calculated as follows.

$$A_P(\omega_k) = \sqrt{(\text{Re}(J(\omega_k, v_k)))^2 + (\text{Im}(J(\omega_k, v_k)))^2}$$ [Math. 8]

$$\phi_P(\omega_k) = \omega_k x = \tan^{-1}\frac{\text{Im}(J(\omega_k, v_k))}{\text{Re}(J(\omega_k, v_k))}$$

Here Re ( ) and Im ( ) are operator symbols which indicate a real part and imaginary part of a complex number respectively.

The calculated phase value $\varphi_P$ ($\omega_k$) is normalized for the processing in subsequent stages. For example, using the phase unwrapping, the signal separation unit 21 converts a plurality of phase values $\varphi_P$ ($\omega_1$), $\varphi_P$ ($\omega_2$), ..., $\varphi_P$ ($\omega_K$) at different spatial frequencies $\omega_k$ into phase values $\theta_P$ ($\omega_1$), $\theta_P$ ($\omega_2$), ..., $\theta_P$ ($\omega_K$) at a common spatial frequency $\omega_L$. For example, if $\varphi_S$ is a phase value in a projection pattern at the spatial frequency $\omega_k$, if $\varphi_L$ is a phase value in a projection pattern at the spatial frequency $\omega_L$ for unwrapping, and if $\alpha$ is an unwrapping scale factor, then the phase value $\theta$ after the conversion can be calculated as follows.

$$\theta = \frac{\phi_S}{\alpha} + \left(\phi_L - \frac{\phi_S}{\alpha}\right)\text{mod}\frac{2\pi}{\alpha}$$ [Math. 9]

The outputs of the processing in step S42 are the amplitude value set $A_P$ of each spatial frequency $\omega_k$, and the normalized phase value set $\theta_P$.

$$A_P=\{A_P(\omega_1),A_P(\omega_2),\ldots,A_P(\omega_k)\}$$

$$\theta_P=\{\theta_P(\omega_1),\theta_P(\omega_2),\ldots,\theta_P(\omega_k)\}$$ [Math. 10]

In the processing in step S42, the amplitude value and the phase value are calculated regarding the primary component signal $I_P$ ($\omega_k$, t) as a single component signal. However, in a stage where the primary component signal $I_P$ ($\omega_k$, t) is not yet sufficiently separated, errors of the amplitude value and the phase value calculated in step S42 with respect to the true values are large. Therefore in step S43, the signal separation unit 21 estimates an amplitude value and a phase value which are closer to the true values (that is, smaller errors) based on the amplitude value set $A_P$ and the phase value set $\theta_P$ determined in step S42. The estimation method here need not be a method that completely eliminates errors, but may be a method that can reduce errors, even slightly (this is called a "weak estimation"). By repeatedly applying this weak estimation, the amplitude value and the phase value gradually become closer to the true values, thereby a practical separation accuracy can be acquired.

The specific method of weak estimation does not matter. The magnitude of the error of each amplitude value and the positive/negative of the error differ depending on the spatial frequency $\omega_k$, hence a plurality of amplitude values $A_P(\omega_k)$ calculated in step S42 are more likely to be distributed on the positive side and negative side of the true value respectively. In other words, the true value of the amplitude value is more likely to exist between the minimum value and the maximum value of the plurality of amplitude values $A_P(\omega_k)$. Therefore an amplitude value close to the true value is expected to be acquired by determining the amplitude value, so as to be a value that is greater than the minimum value and smaller than the maximum value of the plurality of amplitude values $A_P(\omega_k)$. For example, a mean value or a median value of the plurality of amplitude values $A_P(\omega_k)$ is determined. This is also applicable to the phase value $\theta_P(\omega_k)$.

In this embodiment, "averaging" is used as a method for the weak estimation. In concrete terms, in step S43, the signal separation unit 21 calculates the corrected amplitude value ($A_P$ hat) and the corrected phase value ($\theta_P$ hat) which are defined as follows.

$$\hat{A}_P \triangleq \frac{1}{K}\sum_{k=1}^{K} A_P(\omega_k) \qquad [\text{Math. 11}]$$

$$\hat{\theta}_P \triangleq \frac{1}{K}\sum_{k=1}^{K} \theta_P(\omega_k)$$

If the damping ratio of the amplitude is different depending on the spatial frequency $\omega_k$, the corrected amplitude value may be calculated as follows.

$$\hat{A}_P \triangleq \frac{1}{K}\sum_{k=1}^{K} \frac{1}{r_k} A_P(\omega_k) \qquad [\text{Math. 12}]$$

Here $r_k$ is a damping ratio of the amplitude of the projection pattern at the spatial frequency $\omega_k$.

In step S44, the signal separation unit 21 reproduces the brightness signal with respect to each spatial frequency $\omega_k$ based on the corrected amplitude value and the corrected phase value determined in step S43. If the damping ratio of the amplitude can be regarded as constant, regardless what the spatial frequency $\omega_k$ is, then the brightness signal can be calculated as follows.

$$I'_P(\omega_k, t) = \hat{A}_P \cos\left(\frac{\omega_k}{\omega_L}\hat{\theta}_P + v_k t\right) \qquad [\text{Math. 13}]$$

If the damping ratio of the amplitude is different depending on the spatial frequency $\omega_k$, on the other hand, the brightness signal can be calculated as follows.

$$I'_P(\omega_k, t) = r_k \hat{A}_P \cos\left(\frac{\omega_k}{\omega_L}\hat{\theta}_P + v_k t\right) \qquad [\text{Math. 14}]$$

The brightness signal $I_P'(\omega_k, t)$ reproduced like this is a signal errors of which of the amplitude and the phase are reduced compared with the original primary component signal $I_P(\omega_k, t)$ used in step S42. The above processing in steps S42 to S44 is an example of the "first step" according to the present invention, the original brightness signal $I_P(\omega_k, t)$ is an example of the "estimation value of the first component signal" according to the present invention, and the reproduced brightness signal $I_P'(\omega_k, t)$ is an example of the "corrected estimation value of the first component signal" according to the present invention.

In step S45, the signal separation unit 21 subtracts the brightness signal $I_P'(\omega_k, t)$ determined in step S44 from the observation signal $I(\omega_k, t)$ at each spatial frequency $\omega_k$. Thereby the estimation value of the secondary component signal $I_S(\omega_k, t)$ can be updated. Compared with the original primary component signal $I_P(\omega_k, t)$, the error of the brightness signal $I_P'(\omega_k, t)$ is smaller, hence the error of the secondary component signal $I_S(\omega_k, t)$ can also be reduced by this update processing. This processing in step S45 is an example of the "second step" according to the present invention, and the brightness signal $I_S(\omega_k, t)$ determined in step S45 is an example of the "estimation value of the second component signal" according to the present invention.

Then in step S46, the signal separation unit 21 calculates the amplitude value $A_S(\omega_k)$ and the phase value $\theta_S(\omega_k)$ from the secondary component signal $I_S(\omega_k, t)$ at each spatial frequency $\omega_k$. A specific processing content thereof is the same as step S42 (the subject here, however, is the secondary component signal instead of the primary component signal), hence a detailed description is omitted. As the output of the processing in step S46, the amplitude value set $A_S$ of the secondary component signal $I_S(\omega_k, t)$ of each spatial frequency $\omega_k$ and normalized phase value set $\theta_S$ are acquired.

In step S47, the signal separation unit 21 calculates the corrected amplitude value (As hat) and the corrected phase value ($\theta_S$ hat), which are closer to the true values, based on the amplitude value set $A_S$ and the phase value set $\theta_S$ determined in step S46. A specific processing content thereof is the same as step S43 (the subject here, however, is the secondary component signal, instead of the primary component signal), hence a detailed description is omitted.

In step S48, the signal separation unit 21 reproduces the brightness signal with respect to each spatial frequency $\omega_k$ based on the corrected amplitude value and the corrected phase value determined in step S47. If the damping ratio of the amplitude can be regarded as constant, regardless what the spatial frequency $\omega_k$ is, then the brightness signal can be calculated as follows.

$$I'_S(\omega_k, t) = \hat{A}_S \cos\left(\frac{\omega_k}{\omega_L}\hat{\theta}_S + v_k t\right) \qquad [\text{Math. 15}]$$

If the damping ratio of the amplitude is different depending on the spatial frequency $\omega_k$, on the other hand, the brightness signal can be calculated as follows.

$$I'_S(\omega_k, t) = r_k \hat{A}_S \cos\left(\frac{\omega_k}{\omega_L}\hat{\theta}_S + v_k t\right) \qquad [\text{Math. 16}]$$

The brightness signal $I_S'(\omega_k, t)$ reproduced like this is a signal errors of which of the amplitude and the phase are reduced compared with the original secondary component signal $I_S(\omega_k, t)$ used in step S46. The above processing in step S46 to S48 is an example of the "third step" according to the present invention, the original brightness signal $I_S(\omega_k, t)$ is an example of the "estimation value of the second component signal" according to the present invention, and the reproduced brightness signal $I_S'(\omega_k, t)$ is an example of the "corrected estimation value of the second component signal" according to the present invention.

In step S49, the signal separation unit 21 subtracts the brightness signal $I_S'(\omega_k, t)$ determined in step S48 from the observation signal $I(\omega_k, t)$ at each spatial frequency $\omega_k$. Thereby the estimation value of the primary component signal $I_P(\omega_k, t)$ can be updated. Compared with the original secondary component signal $I_S(\omega_k, t)$, the error of the brightness signal $I_S'(\omega_k, t)$ is smaller, hence the error of the primary component signal $I_P(\omega_k, t)$ can also be reduced by this update processing. This processing in step S49 is an example of the "fourth step" according to the present invention, and the brightness signal $I_P(\omega_k, t)$ determined in step S49 is an example of the "estimation value of the primary component signal" according to the present invention.

By repeating the above mentioned operations in step S42 to S49 a plurality of times, the estimation value of each component signal is sequentially updated so that the errors of the amplitude and the phase of each component signal (differences from the true values) decrease. Therefore the observation signal $I(\omega_k, t)$ can be accurately separated into the two component signals, $I_P(\omega_k, t)$ and $I_S(\omega_k, t)$. The number of times of repeat may be determined in advance, or may be dynamically changed by evaluating the degree of convergence of the estimation value of each component signal using a predetermined evaluation formula.

Three-Dimensional Shape Measurement

Figure 5:
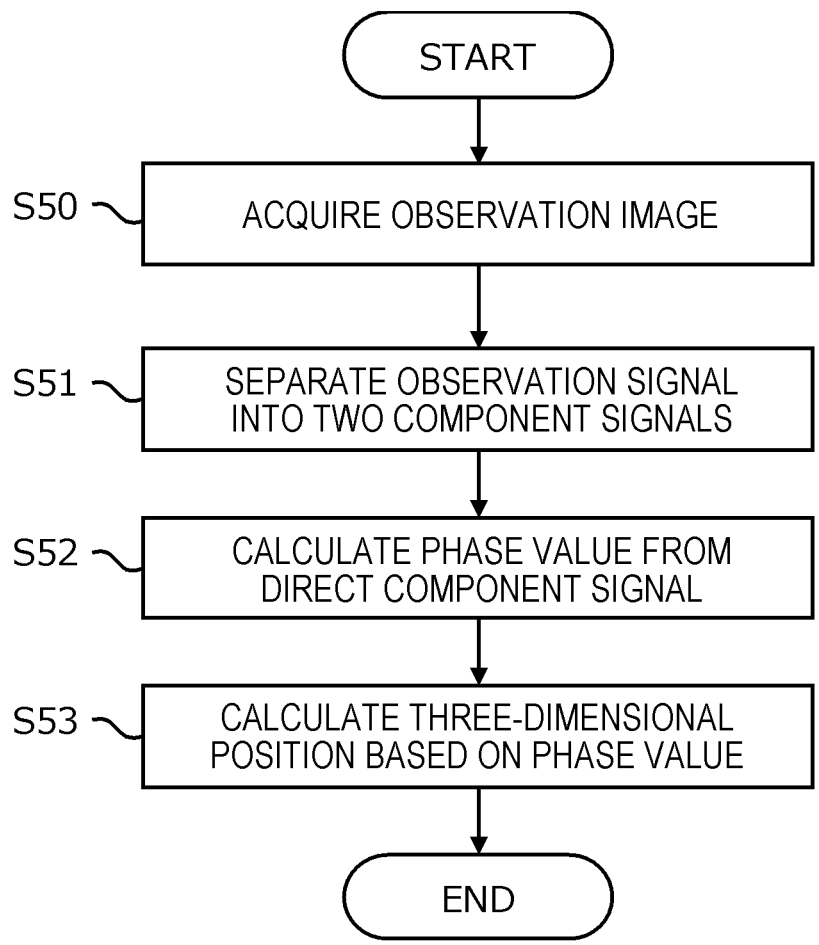
FIG. 5 is a flow chart depicting the three-dimensional shape measurement processing.
Figure 6:
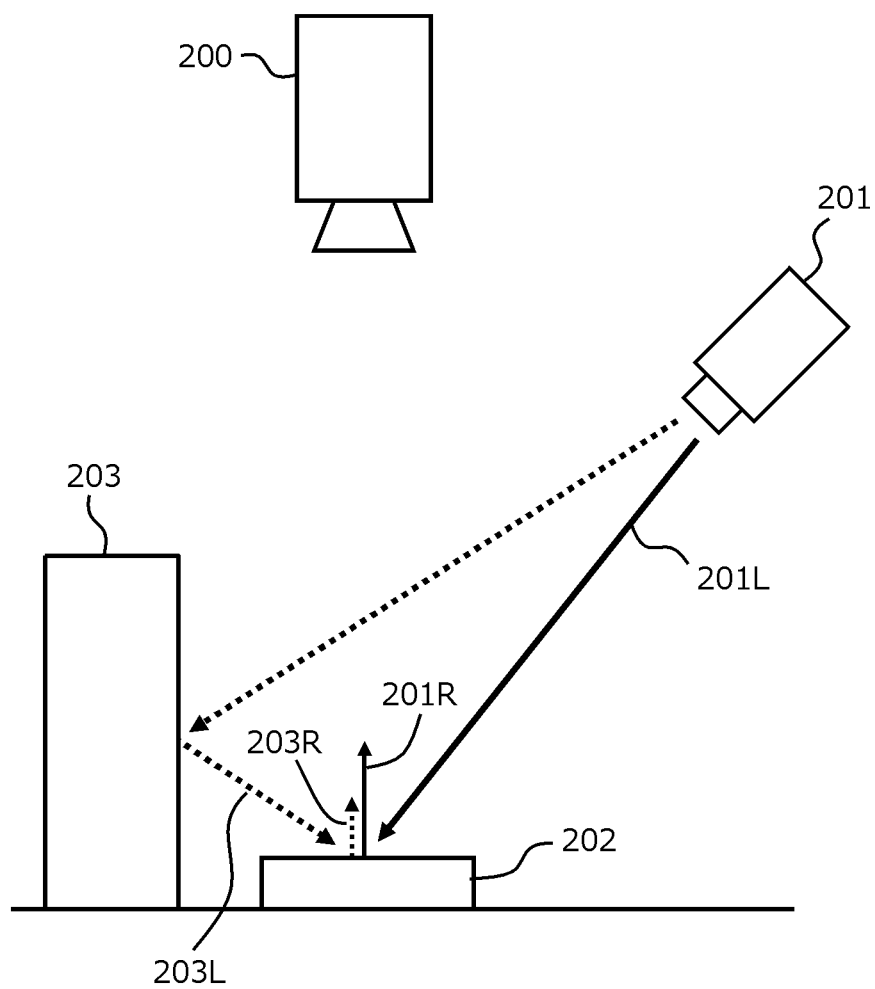
FIG. 6 is a diagram depicting the inter-reflection.

An example of the processing flow of the three-dimensional shape measurement according to this embodiment will be described with reference to the flow chart in FIG. 5.

In step S50, the control device 12 controls the projection device 10 and the imaging device 11, and captures a plurality of observation images. For example, the control device 12 projects a fringe pattern, wherein brightness of the fringe pattern changes sinusoidally, four times while changing the phase by $\pi/2$ at a time, and captures four observation images.

In order to achieve high measurement accuracy (resolution), it is preferable that the spatial frequency $\omega$ of the fringe pattern is high frequency. However the measurement range depends on the cycle of the fringe pattern. Therefore, the measurement range decreases, which is disadvantageous, as the frequency of the fringe pattern becomes higher. Therefore the measurement range is expanded by converting the high frequency phase into a low frequency phase. This method is called "phase unwrapping". By phase unwrapping, high measurement accuracy and a wide measurement range are both implemented.

To perform the phase unwrapping, a plurality of observation images having mutually different spatial frequencies are acquired using a plurality of projection patterns having mutually different spatial frequencies. For example, in the case of phase unwrapping that is normally used, images of a projection pattern at high frequency for measurement and a projection pattern at low frequency for unwrapping are captured, and in the case of MPS, images of a plurality of types of projection patterns at high frequency are captured. The data of the observation image is loaded into the control device 12 by the image acquisition unit 20, and is stored by the memory or the non-volatile storage device.

In step S51, the signal separation unit 21 performs the processing for separating the observation signal at each pixel of the observation image into two component signals. Specific processing of the signal separation is as described in FIG. 4. In this embodiment, the primary component signal is regarded as the direct component signal.

In step S52, the phase calculation unit 22 calculates the phase value of the pixel of interest from the direct component signal separated in step S51. The phase value acquired in the calculation step of the signal separation in step S51 (e.g. corrected phase value ($\theta_P$ hat) determined in step S43 in FIG. 4) may be used.

Then in step S53, the three-dimensional restoration unit 23 calculates the three-dimensional position of each pixel of the observation image (that is, each measurement point on the surface of the measurement object) based on the phase value of each pixel calculated by the phase calculation unit 22. Thereby the three-dimensional shape of the measurement object surface can be restored. A method of converting the phase value into a three-dimensional position (height information) is, for example, determining a conversion formula between the phase and the height in advance by calibration, and determining the height information by inserting the phase value into the conversion formula.

According to the above mentioned signal separation method of this embodiment, the direct component signal can be accurately separated from the observation signal. Then by using the phase of the separated direct component signal for calculating the three-dimensional position of the measurement point, highly accurate three-dimensional shape measurement, in which the influence of inter-reflection is reduced, can be implemented. The method of this embodiment can be used, even if the ratio of the direct component signal and the indirect component signal included in the observation signal is totally unknown, that is, even if special prior knowledge and preconditions are not available. For example, in an actual situation where this method is applied, conditions, such as the degree of influence of inter-reflection, the shape of the causative object of inter-reflection (shape and orientation of the reflection surface), reflection characteristics (e.g. reflectance), and the positional relationship between the causative object of inter-reflection and the measurement object, vary, but the method of this embodiment can be universally used under all conditions. This means that the method of this embodiment can be easily implemented in actual apparatuses.

The above description of the embodiment merely exemplifies the present invention. The present invention is not limited to this embodiment, but may be modified in various ways within the scope of the technical idea thereof.

REFERENCE SIGNS LIST

1 Three-dimensional shape measurement device
10 Projection device
11 Imaging device
12 Control device
20 Image acquisition unit
21 Signal separation unit
22 Phase calculation unit
23 Three-dimensional restoration unit
30 Reflection surface
31 Reflection surface

The invention claimed is:

1. A three-dimensional shape measurement device, comprising:
   a projection device;
   an imaging device; and
   a control device configured to measure a three-dimensional shape of a measurement object based on an observation signal observed by the imaging device, in a state of projecting a projection pattern, which has cyclicity in a time direction and a space direction, from the projection device to the measurement object,
   wherein the observation signal comprises a composite signal of a first component signal and a second component signal, the first component signal and the second component signal having phases that are different from each other,
   wherein the control device is configured to:
   acquire a plurality of observation signals observed using a plurality of projection patterns having mutually different spatial frequencies as the observation signals with respect to a measurement point on the measurement object;
   set an initial value of an estimation value of the first component signal for each observation signal;
   estimate the first component signal and the second component signal included in each observation signal by repeatedly executing operations comprising:
     determining a corrected estimation value of the first component signal of each observation signal by applying first correction processing, which reduces errors of amplitude and a phase, to the estimation value of the first component signal of each observation signal;
     determining an estimation value of the second component signal of each observation signal by subtracting the corrected estimation value of the first component signal from each observation signal;
     determining a corrected estimation value of the second component signal of each observation signal by applying second correction processing, which reduces errors of amplitude and a phase, to the estimation value of the second component signal of each observation signal; and
     determining an estimation value of the first component signal of each observation signal by subtracting the corrected estimation value of the second component signal from each observation signal; and
   calculate a three-dimensional position of the measurement point based on a phase of the estimated first component signal or second component signal.

2. The three-dimensional shape measurement device according to claim 1,
   wherein one of the first component signal and the second component signal comprises a direct component signal, which corresponds to light which is projected from the projection device, and is reflected at the measurement point and enters the imaging device, and
   the other signal of the first component signal and the second component signal comprises an indirect component signal, which corresponds to light which is projected from the projection device, is reflected by another reflection surface, and is reflected at the measurement point and enters the imaging device.

3. The three-dimensional shape measurement device according to claim 1,
   wherein the first correction processing comprises:
   acquiring a plurality of amplitude values and a plurality of phase values for each spatial frequency of the plurality of projection patterns by calculating the amplitude and the phase from the estimation value of the first component signal of each observation signal,
   determining a corrected amplitude value such that the corrected amplitude value is greater than a minimum value and smaller than a maximum value of the plurality of amplitude values,
   normalizing the plurality of phase values and determining a corrected phase value such that the corrected phase value is greater than a minimum value and smaller than a maximum value of the plurality of normalized phase values, and
   reproducing a brightness signal for each spatial frequency of the plurality of projection patterns based on the corrected amplitude value and the corrected phase value,
   wherein the reproduced brightness signal for each spatial frequency comprises the corrected estimation value of the first component signal of each observation signal.

4. The three-dimensional shape measurement device according to claim 1,
   wherein the second correction processing comprises:
   acquiring a plurality of amplitude values and a plurality of phase values for each spatial frequency of the plurality of projection patterns by calculating the amplitude and the phase from the estimation value of the second component signal of each observation signal,
   determining a corrected amplitude value such that the corrected amplitude value is greater than a minimum value and smaller than a maximum value of the plurality of amplitude values,
   normalizing the plurality of phase values and determining a corrected phase value such that the corrected phase value is greater than a minimum value and smaller than a maximum value of the plurality of normalized phase values, and
   reproducing a brightness signal for each spatial frequency of the plurality of projection patterns based on the corrected amplitude value and the corrected phase value,
   wherein the reproduced brightness signal for each spatial frequency comprises the corrected estimation value of the second component signal of each observation signal.

5. The three-dimensional shape measurement device according to claim 3, wherein the corrected amplitude value comprises a mean value or a median value of the plurality of amplitude values.

6. The three-dimensional shape measurement device according to claim 3, wherein the corrected phase value comprises a mean value or a median value of the plurality of normalized phase values.

7. The three-dimensional shape measurement device according to claim 3, wherein the processing for normalizing the plurality of phase values comprises processing for converting the plurality of phase values into a phase value with respect to a common spatial frequency.

8. The three-dimensional shape measurement device according to claim 1, wherein the control device is configured to calculate the three-dimensional position of the measurement point by the phase shift method or micro phase shifting based on the phase of the estimated first component signal or second component signal.

9. A three-dimensional shape measurement method for measuring a three-dimensional shape of a measurement object based on an observation signal observed by an imaging device, in a state of projecting a projection pattern, which has cyclicity in a time direction and a space direction, from a projection device to the measurement object,
    wherein the observation signal comprises a composite signal of a first component signal and a second component signal, the first component signal and the second component signal having phases that are different from each other,
    the three-dimensional shape measurement method comprising:
    acquiring a plurality of observation signals observed using a plurality of projection patterns having mutually different spatial frequencies as the observation signals with respect to a measurement point on the measurement object;
    setting an initial value of an estimation value of the first component signal for each observation signal;
    estimating the first component signal and the second component signal included in each observation signal by repeatedly executing operations comprising:
        determining a corrected estimation value of the first component signal of each observation signal by applying first correction processing, which reduces errors of amplitude and a phase, to the estimation value of the first component signal of each observation signal;
        determining an estimation value of the second component signal of each observation signal by subtracting the corrected estimation value of the first component signal from each observation signal;
        determining a corrected estimation value of the second component signal of each observation signal by applying second correction processing, which reduces errors of amplitude and a phase, to the estimation value of the second component signal of each observation signal; and
        determining an estimation value of the first component signal of each observation signal by subtracting the corrected estimation value of the second component signal from each observation signal; and
    calculating a three-dimensional position of the measurement point based on a phase of the estimated first component signal or second component signal.

10. A non-transitory computer-readable storage medium storing a program that causes a computer to execute each step of the three-dimensional shape measurement method according to claim 9.

* * * * *